(12) United States Patent
Reiling et al.

(10) Patent No.: US 7,131,351 B1
(45) Date of Patent: Nov. 7, 2006

(54) DEVICE FOR POST-PROCESSING, MORE PARTICULARLY SHARPENING, A TOOL HAVING A PLURALITY OF TEETH

(76) Inventors: Reinhold Reiling, Remchinger Strasse 4, D-75203 Königsbach-Stein (DE); Karl Reiling, Remchinger Straase 4, D-750203 Königsbach-Stein (DE)

( * ) Notice: Subject to any disclaimer, the term of this patent is extended or adjusted under 35 U.S.C. 154(b) by 623 days.

(21) Appl. No.: 10/049,618

(22) PCT Filed: Aug. 23, 2000

(86) PCT No.: PCT/EP00/08204

§ 371 (c)(1),
(2), (4) Date: Feb. 22, 2002

(87) PCT Pub. No.: WO01/15847

PCT Pub. Date: Mar. 8, 2001

(30) Foreign Application Priority Data

Aug. 26, 1999 (DE) .......................... 199 40 635

(51) Int. Cl.
*B23D 63/12* (2006.01)
*B24B 3/26* (2006.01)

(52) U.S. Cl. .......................... 76/37; 451/409
(58) Field of Classification Search .............. 76/37; 269/305; 451/409, 406; 83/468.7
See application file for complete search history.

(56) References Cited

U.S. PATENT DOCUMENTS 3,427,903 A * 2/1969 Bodington .................. 76/37

3,952,616 A * 4/1976 Varley .......................... 76/40
6,042,096 A * 3/2000 MacLean ..................... 269/37

FOREIGN PATENT DOCUMENTS

EP          0 201 817 A2  *  2/1986
WO        WO 99/22898       *  5/1999

* cited by examiner

*Primary Examiner*—Douglas D. Watts (57) ABSTRACT

A device for dressing a tool having a plurality of teeth, wherein said device comprises a support surface having guiding elements, said guiding elements having at least two movable positioning elements, said movable positioning elements being adapted to be locked in a fixed position within said guiding elements such that said positioning elements form a stop for said tool; and a dressing tool mounted in a holding device positioned in front of a dressing side of said support surface, wherein said dressing tool is locked in position by a locking element during the dressing of said teeth, hence said dressing tool not being movable at least in a direction running substantially parallel to said dressing side; wherein said positioning elements are arranged in said guiding elements in said support surface such that said tool to be dressed engages with said positioning elements at its side turned towards said dressing side of said support surface, so that said tool can be moved towards said positioning elements by a feed movement proceeding in a feed direction starting from a feed side of the support surface, said feed side being located opposite said dressing side of said support surface, and being directed towards said dressing side; and wherein said engagement between said positioning elements and said tool can be discontinued by a return movement of said tool, said movement being oppositely directed to said feed movement.

20 Claims, 12 Drawing Sheets

DEVICE FOR POST-PROCESSING, MORE PARTICULARLY SHARPENING, A TOOL HAVING A PLURALITY OF TEETH

FIELD OF THE INVENTION

The present invention relates to a device for tool dressing. More specifically, the present invention relates to a device for sharpening a tool having a plurality of teeth.

BACKGROUND OF THE INVENTION

It is important for handymen to be able to dress, more specifically, to be able to sharpen, in a simple and convenient way, the tools that have become dull due to long and constant use. The common difficulty arising in such instance is that the tool, in particular a saw blade and/or a drill, has to be kept firmly in position during the sharpening so as to maintain the pertinent surfaces of the tool to be dressed in a defined position, so as to be easily dressed by a sharpening tool without endangering the user.

From U.S. Pat. No. 3,427,903 (further referred to as '903) a device for dressing a sawing tool having a plurality of sawing teeth is known. The device is described as having a support surface possessing a dressing side, on which the sawing tool can be placed. The support surface comprises guiding elements that run orthogonally to the dressing side and in which adjustable positioning elements are arranged. These positioning elements are used to firmly clamp the sawing tool to the support surface, hence immobilizing it to the support surface such that the support surface, itself displaceable by means of a feeding mechanism, can be successively moved past a dressing element of a dressing tool arranged in front of the support surface. The positioning elements act upon the side of the sawing tool opposite the dressing tool.

The device described in '903 has the disadvantage that it is not particularly suited for handymen due to its relatively complicated design. Another, more serious disadvantage of the device is that only elongated sawing tools such as for example, the saw blade of a hand saw, in which the teeth of the saw are arranged straightly and linearly, can be dressed.

Another disadvantage of the device described in '903, is that it does not permit sharpening of circular tools such as, for example, circular saw blades or circular milling tools. Indeed, to achieve the dressing of the individual teeth of the sawing tool, the support surface with the sawing tool firmly clamped onto it in a fixed position, has to be moved past the dressing tool by means of the feeding mechanism moving the support surface. Such arrangement does not permit to dress circular tools.

Yet a further disadvantage of the device described in '903 is that due to the arrangement of the dressing tool relative to the support surface, it is only possible to work on saw teeth possessing a triangular tooth contour. It is therefore not possible to sharpen saw teeth having a different configuration such as, for example, saw teeth of a trapezoidal shape. For the same reason it is not possible either to work on the back of saw teeth or on insert teeth.

It is therefore the object of the present invention to further develop a device of the aforementioned type so that the device according to the invention has a simple design and is particularity suited for the dressing of circular tools.

SUMMARY OF THE INVENTION

This object is solved by a device for dressing a tool having a plurality of teeth, wherein said device comprises a support surface having guiding elements, said guiding elements having at least two movable positioning elements, said movable positioning elements being adapted to be locked in a fixed position within said guiding elements such that said positioning elements form a stop for said tool; and a dressing tool mounted in a holding device positioned in front of a dressing side of said support surface, wherein said dressing tool is locked in position by a locking element during the dressing of said teeth, said dressing tool not being movable at least in a direction running substantially parallel to said dressing side; wherein said positioning elements are arranged in said guiding elements in said support surface such that said tool to be dressed engages with said positioning elements at its side turned towards said dressing side of said support surface, so that said tool can be moved towards said positioning elements by a feed movement proceeding in a feed direction starting from a feed side of the support surface, said feed side being located opposite said dressing side of said support surface, and being directed towards said dressing side; and wherein said engagement between said positioning elements and said tool can be discontinued by a return movement of said tool, said movement being oppositely directed to said feed movement.

The inventive device has the advantage that an easy positioning, especially of circular saw blades, for the sharpening of the sawing teeth of sawing blades, or of other circular tools having at least one tooth, is achieved. According to the invention it is provided that the guiding elements arranged in the support surface (which provides a good support for the tool lying on it) and accomodating the positioning elements being adjustable in different positions in the guiding elements, are arranged in such a way that the tool to be dressed by the inventive device can be moved to the positioning elements engaging the tool in its area adjacent to the dressing side, by means of a feeding movement proceeding in the feeding direction starting from said feed side, which is located opposite said dressing side of said support surface, and being directed toward said dressing side. This measure advantageously achieves that the inventive device can be used for a large number of circular tools having sawing blades with different diameters. Furthermore, the adjustability of the positioning elements in different positions in their guiding elements results in an easy adaptation to various blade diameters.

Additionally, the device according to the present invention does not only distinguish itself by its simple operation but also by its simple design, consequently dispensing with any powered feeding mechanisms for dressing tools. During the dressing operation, the dressing tool is advantageously positioned in a suitable position in front of the tool to be dressed, and remains locked in this position during the entire dressing operation, unless a readjustment is required due to varying tooth contours.

The device according to the present invention advantageously allows for teeth of any contour, particularly the back of teeth or trapezoidally designed teeth or insert teeth to be dressed.

An advantageous further development of the invention provides that the device comprises a drill mounting device for a drilling tool in which the drilling tool to be sharpened can be locked in position. Such a measure has the advantage that with the inventive device not only saw blades but also drilling tools can be dressed, especially for the purpose of sharpening.

A further advantageous development of the invention provides that the device comprises means for assisting in the mounting of a drilling tool in an adapter, which can be inserted in the mounting unit of the device. Such a measure has the advantage that the mounting of the drilling tool in the adapter can be carried out with particular ease.

Yet another further advantageous development of the invention provides that the device comprises a holding device for the dressing tool, with which the dressing of the tool being positioned by the inventive device is to be carried out. Such a measure has the advantage that in an very simple way a defined positional relation between the tool to be dressed and the corresponding dressing tool can be established.

Further advantageous developments of the invention are subject of the dependent claims.

BRIEF DESCRIPTION OF THE DRAWINGS

The present invention will be further understood from the following description with reference to the drawings in which.

DESCRIPTION OF PREFERRED EMBODIMENTS

Figure 1:
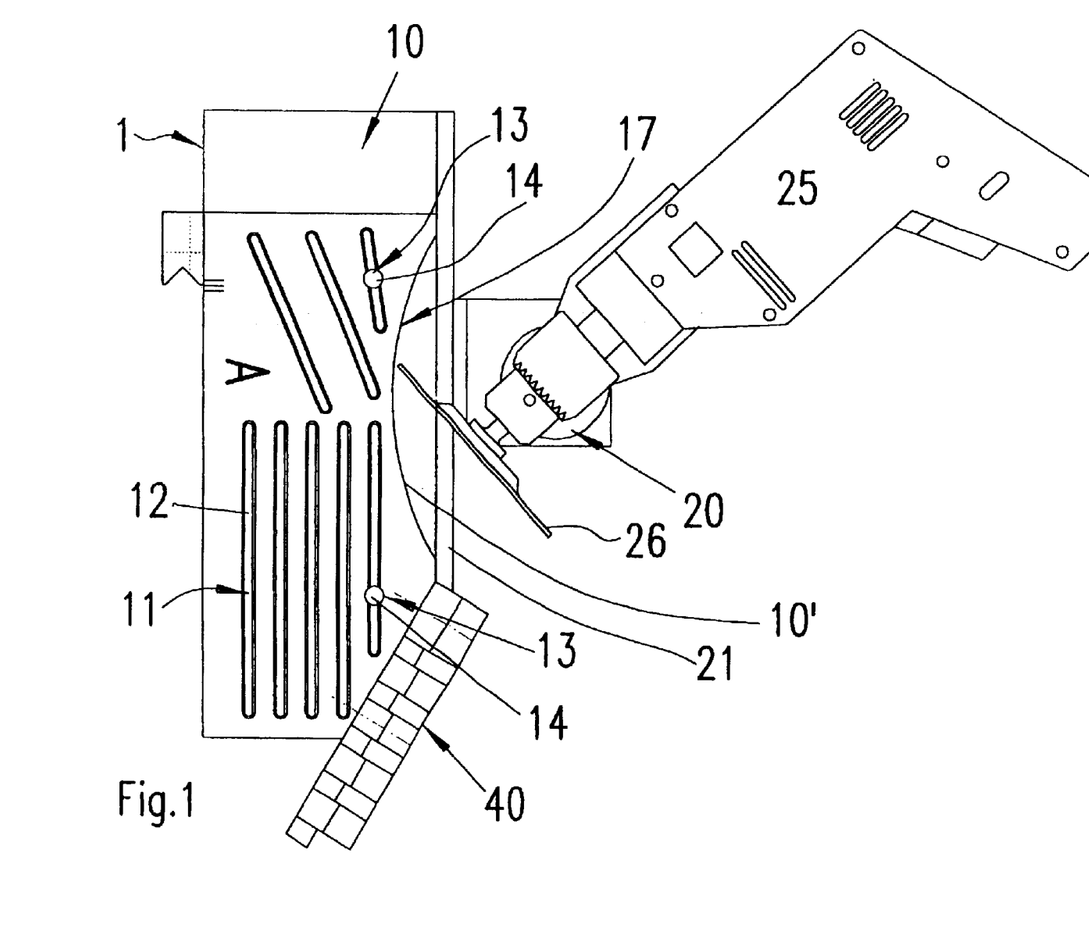
FIG. 1 illustrates a top view of the device in accordance with a first embodiment of the present invention.
Figure 2:
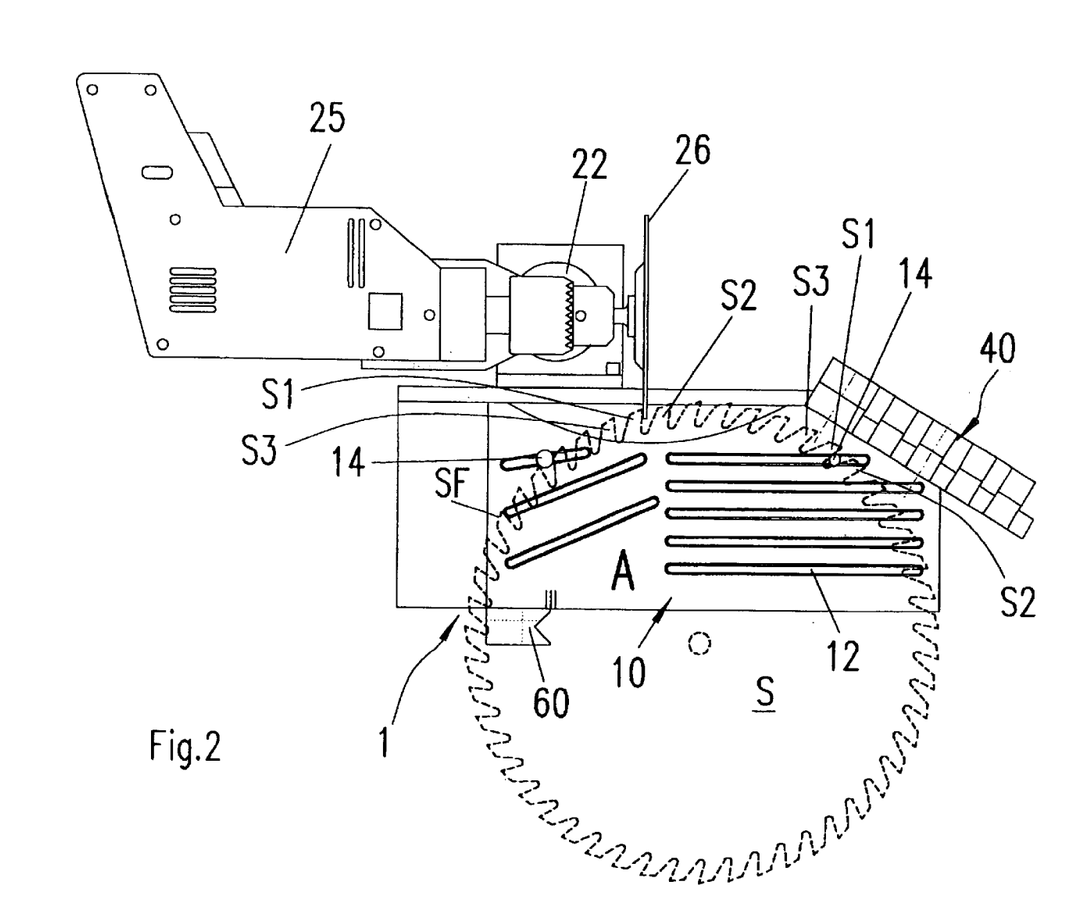
FIG. 2 illustrates a top view of the device of FIG. 1 together with a saw blade to be dressed.
Figure 3:
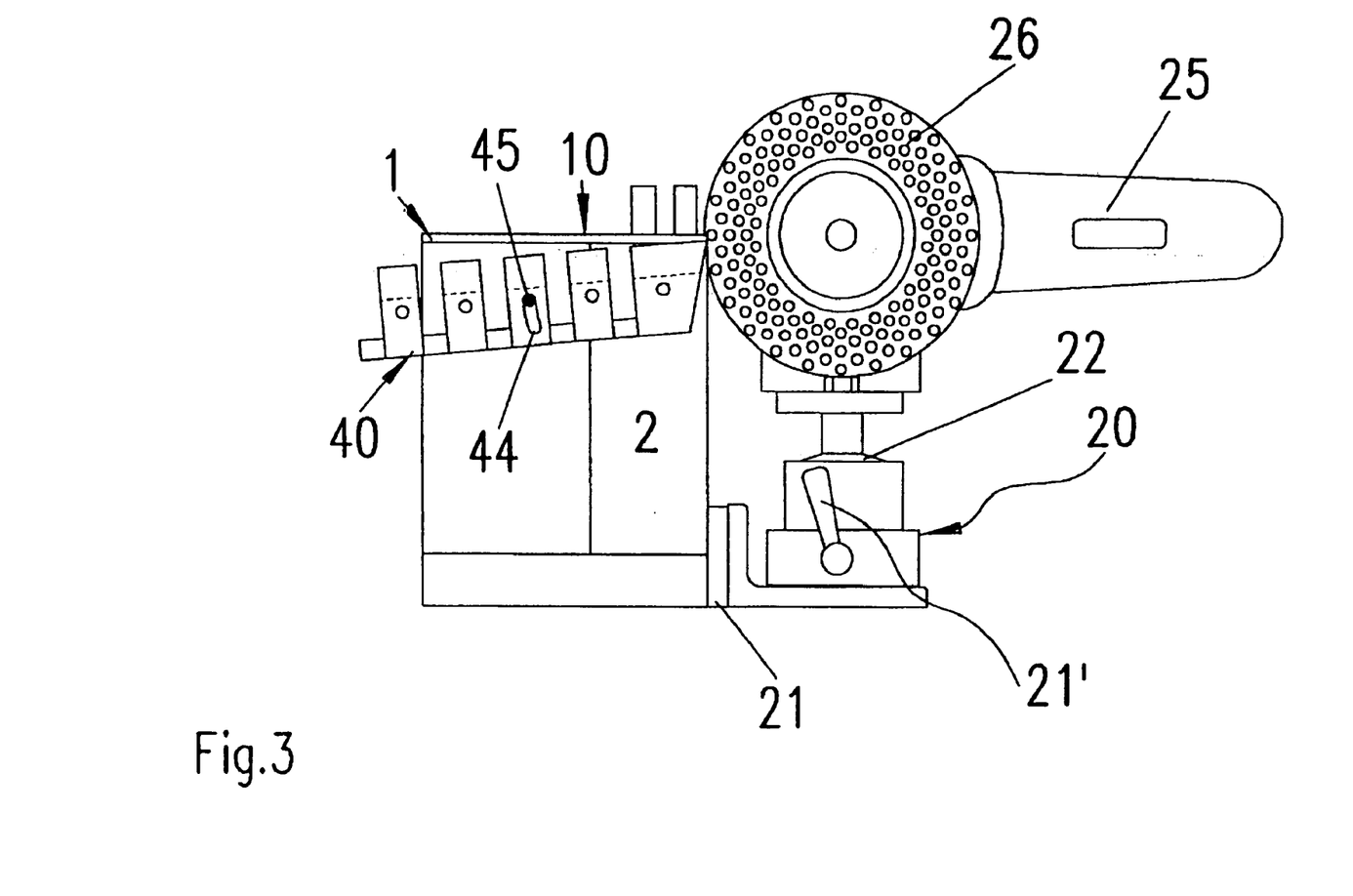
FIG. 3 illustrates a view of the first embodiment along direction III of FIG. 1.

The device for dressing a tool, in particular a saw blade and/or a drilling tool, as shown in FIGS. 1 to 3 and generally designated by 1, comprises a support surface 10 which is positioned on a suitable carrier structure 9. The support surface 10 has guiding elements 11 which, in the case shown here, are designed as elongated slots 12. Positioning elements 13 are slidably arranged in the guiding elements 11, and which, in the case shown here, are designed as positioning pins 14.

As can be seen best from FIGS. 2 and 3, device 1 possesses at its front side a holding device 20 for a dressing tool 25, in particular a grinding device with a motor driven grinding wheel 26. The holding device 20 for the dressing tool 25 can be moved along a guide rail 21 of device 1, in the longitudinal direction of the support surface 10, thus substantially parallel to a dressing side 10' of the support surface 10. The holding device 20 can be locked in position by means of a stop lever 21' representing a locking element. The holding device 20 additionally comprises a ball end 22, by which means the dressing tool 25 can be tilted in a way known to those skilled in the art. A fine adjustment device 23 allows, by means of a suitable actuation of an adjustment screw 23', an exact positioning of the dressing tool 25 and thus the grinding wheel 26 representing a dressing element of the dressing tool 25, with respect to the tool's surface to be dressed, for example, the circular saw blade S (see FIG. 2). This particularly allows for an exact control of the thickness of material to be removed by the grinding wheel 26. In order not to obstruct the movement of the grinding wheel 26 of the dressing tool 25, it is preferable that the support surface 10 is provided with a concave recess 17 in its dressing side 10' adjacent to the dressing tool 25.

In order to be able to dress, in particular to be able to sharpen the saw blade S, shown sketched in FIG. 2, by means of the dressing tool 25, the saw blade S is positioned flat on the support surface 10. The two positioning pins 14 are moved in their guiding elements 11 until a secure stop is formed for the saw blade S. It can be provided in this case that the positioning pins 14 are arranged in such a way in the guiding elements 11, so that the positioning pins 14 enter at least to some extent into the open spaces defined between two saw teeth S1, S2 and S1', S2', respectively, as is shown, for example, in FIG. 2. However, it is also possible to arrange the positioning pins 14 in such a way, so that they engage flanks SF arranged in the circumferential direction of the sawing blade SF.

As can be best seen from FIG. 2, it is preferred that the positioning pins 14 are arranged on the support surface 10 in such a manner, so that they act upon the front section of saw blade S facing the dressing side 10' of the support surface 10. This arrangement has the advantage that the saw blade S can be easily positioned in an unobtrusive manner on the support surface 10 of device 1 by the positioning pins 14 and is therefore appropriately positioned for the dressing operation.

When saw blade S has been positioned as previously described, saw tooth S4 is in the dressing range of grinding wheel 26, and is dressed with the grinding wheel 26 of the dressing tool 25. For this purpose, the dressing tool 25 was moved beforehand so far along the guide rail 21 of device 1 and, if required, tilted in such a way around the ball end 22 until the grinding wheel 26 of the dressing tool 25 is aligned in accordance with the dressing operation to be carried out on saw tooth S4. The dressing tool 25 is then locked in this sharpening position by clamping the stop lever 21', which represents a locking element for the sharpening tool 25, as well as, if required, through fixing the ball end 22. This ensures that the dressing tool 25 is in a fixed position during the dressing of saw tooth S4, at least in the direction of guide rail 21.

After the dressing of saw tooth S4, saw blade S is pulled back slightly against its direction of feed Z, in fact it is sufficiently pulled back such that the active engagement of the positioning pins 14 with the saw blade S is discontinued. The saw blade S can therefore be moved by means of a simple manual rotation in its circumferential direction so that after an appropriate movement of the saw blade S in the direction of feed Z, the two positioning pins 14 enter into the open spaces following the former ones in the direction of rotation, defined between the saw teeth S2, S3 and S2', S3' respectively. Saw tooth S5, which is now in the dressing range of the grinding wheel 26, is subsequently dressed, etc.

Since, usually all saw teeth S1–S5 of a saw blade have the same tooth contour, it is not necessary to change the alignment of the grinding wheel 26. It is understood that with deviating teeth contours of the saw teeth S1–S5, the dressing tool 25 can be realigned as required by an appropriate displacement along the guide rail 21, or by a resetting of the ball end 22.

The aforementioned sharpening operation comprising; advancing the saw blade S in the direction of feed Z starting at a feed side 10", being opposite the dressing side 10' of the support surface 10, until the positioning pins 14 engage with the section of the saw blade S that is facing the dressing side 10', hence forming a stop for the saw blade S; dressing of one of the saw teeth S1–S5; pulling back the saw blade S in a direction opposite the direction of feed Z until the active engagement between saw blade S and the positioning pins 14 is discontinued; rotating the saw blade S until the next to be dressed saw tooth S1–S5 is in front of the dressing tool 25; advancing the saw blade S in the direction of feed until the positioning pins 14 again engage saw blade S; is carried out until all saw teeth S1–S3 of saw blade S are dressed. Finally, saw blade S is removed from device 1 by simply pulling the saw blade S back from the support surface 10.

In order to be able to not only dress, especially sharpen, saw blades or similar, preferably circular objects having on their circumference a contour to be dressed, with the present device, but also pin shaped objects such as, for example, drill bits or similar drilling tools, the device 1 is preferably provided with a mounting device 40 into which, for example, a drill bit can be inserted.

Figures 5, 5A, 5B, 5C:
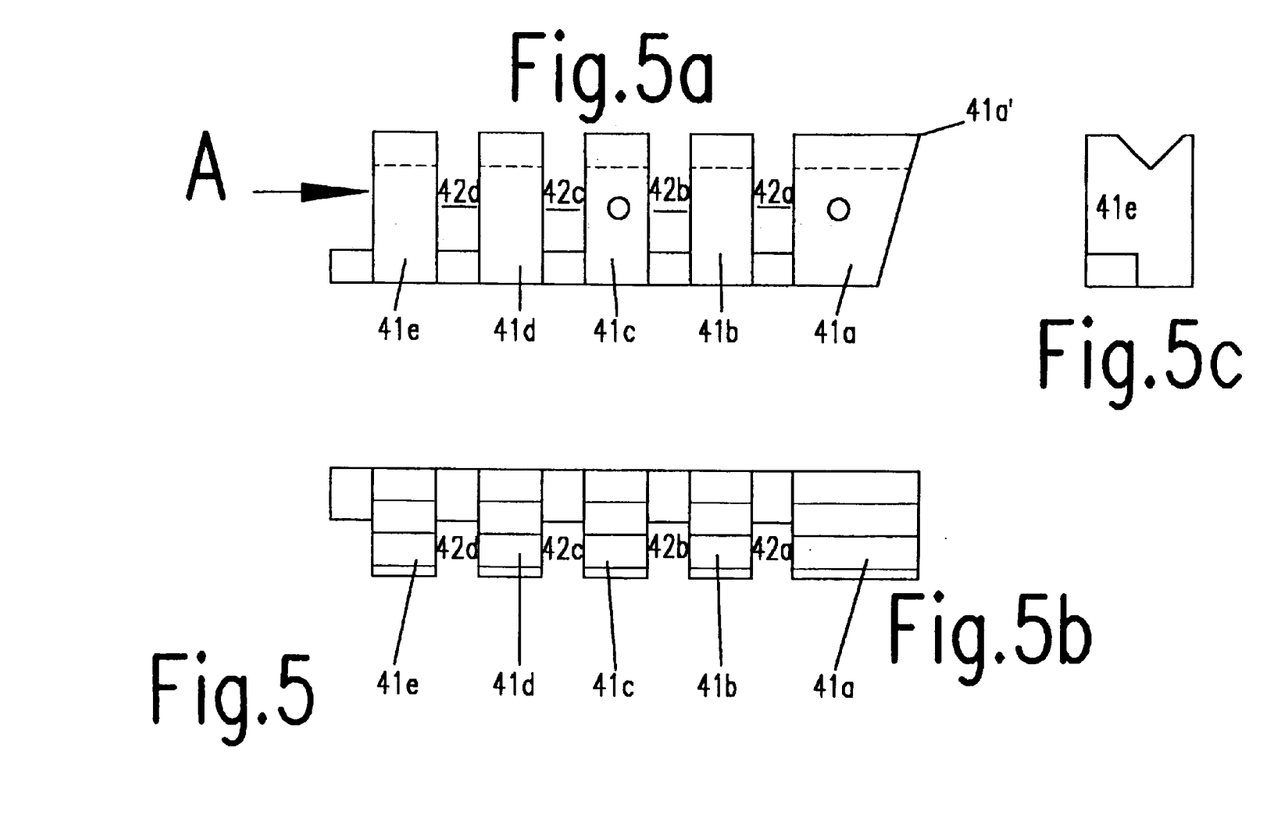
FIGS. 5, 5a, 5b and 5c illustrate a representation of a mounting unit of the device of the present invention.
Figure 6:
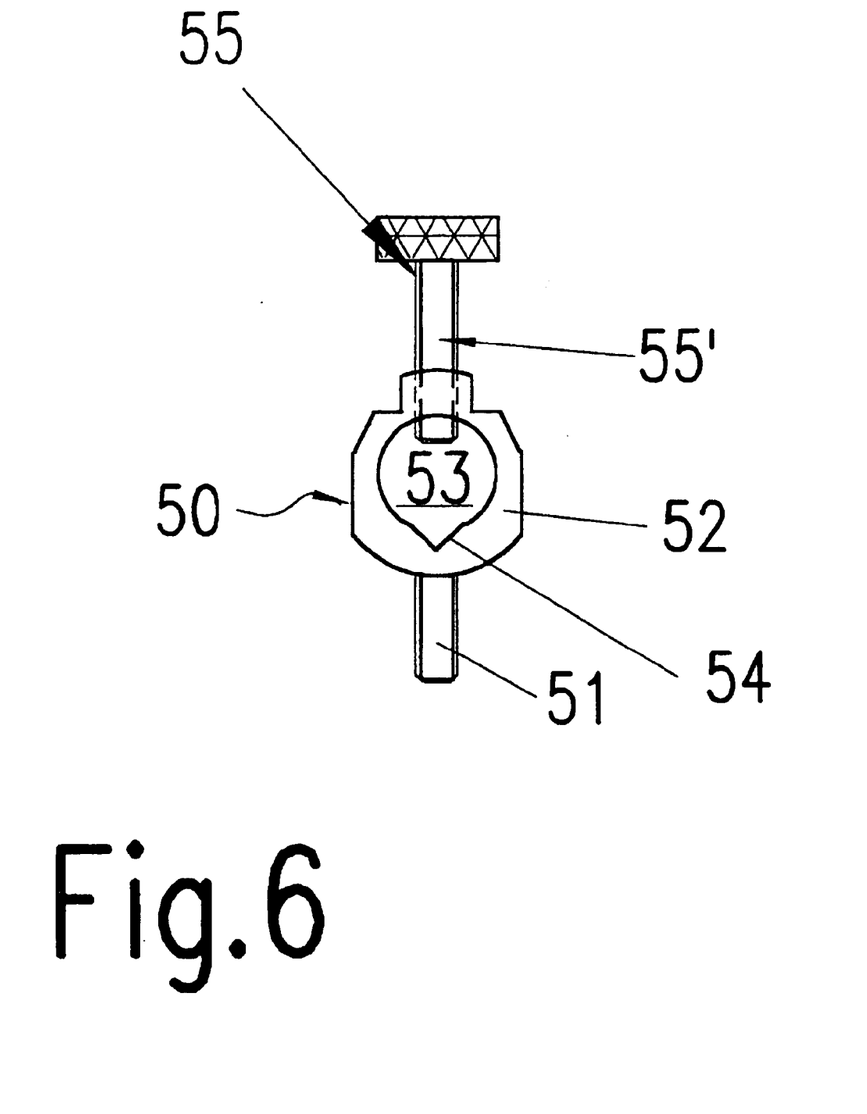
FIG. 6 illustrates an embodiment of an adapter for the mounting unit.
Figure 7:
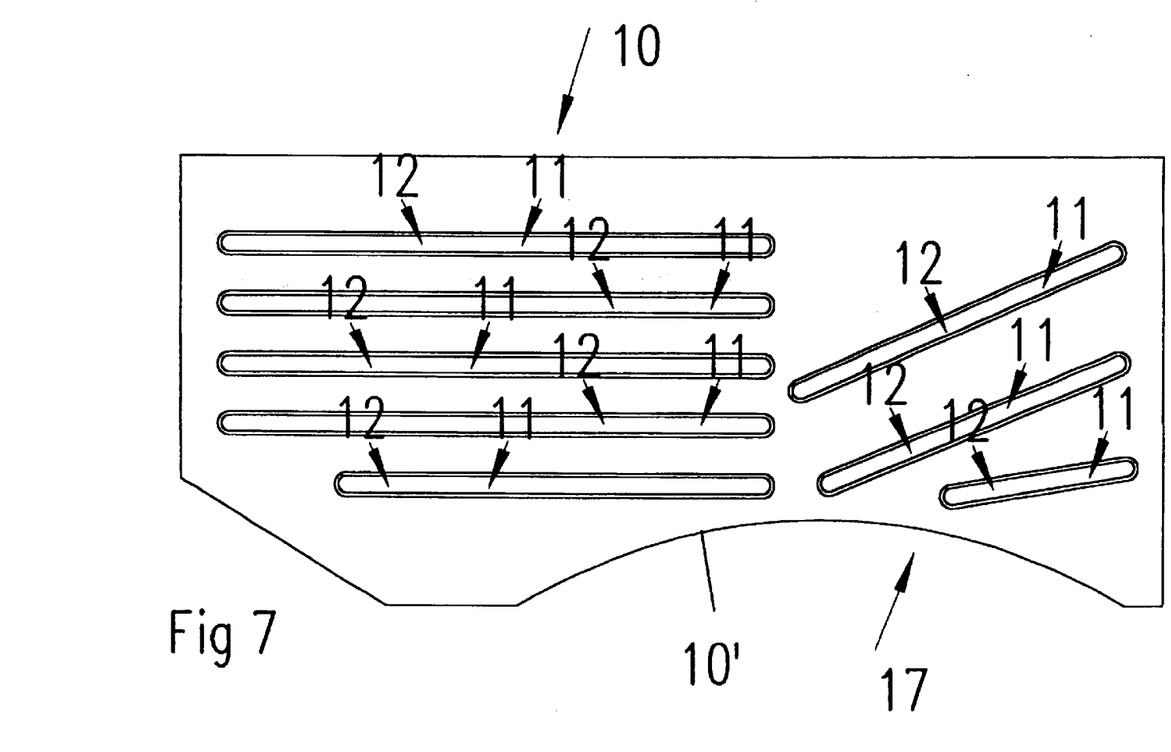
FIG. 7 illustrates an enlarged representation of a first embodiment of a support surface.

The mounting device 40 can best be seen from FIG. 3 and is shown in greater detail in FIGS. 5 and 6. More specifically, FIG. 5a shows a side view, FIG. 5b shows a top view, and FIG. 5c shows another side view of the mounting device 40 from a direction A.

The mounting device 40 possesses a number of mounting blocks 41a–41e, which are arranged at a distance from one another such that between two adjacent mounting blocks 41a–41d there is a space 42a–42d. These spaces 42a–42d are dimensioned in such a way so that an extension 51 of an adapter 50 as shown in FIG. 6, can be inserted with clearance.

Referring to FIG. 6, the adapter 50 possesses a central element 52 which is provided with a mounting opening 53 for a drill bit. A V-shaped groove 54 facilitates the locking into position of small diameter drill bits in the mounting opening 53.

A tightening screw 55, entering the mounting opening 53, serves to secure the drill bit in the mounting opening 53. It is advantageous if the tightening screw 55 is of such a design so that its body 55' can be likewise inserted into one of the spaces 42a–42d of the mounting unit 40, so that it can fulfill the function corresponding to the extension 51.

This arrangement advantageously allows one to dress two oppositely located surfaces (180° with respect to one another) of a pin shaped tool, in a single mounting. For the sharpening of the first surface for example, extension 51 is inserted into one of the spaces 42a–42d of the mounting device 40. After completion of the sharpening operation, the adapter 50 is removed from the mounting device 40 and rotated by 180° and then reinserted into the mounting device 40 in such a way so that the body 55' of the tightening screw 55 is inserted into one of the spaces 42a–42d between two mounting blocks 41a–41e.

Figure 4:
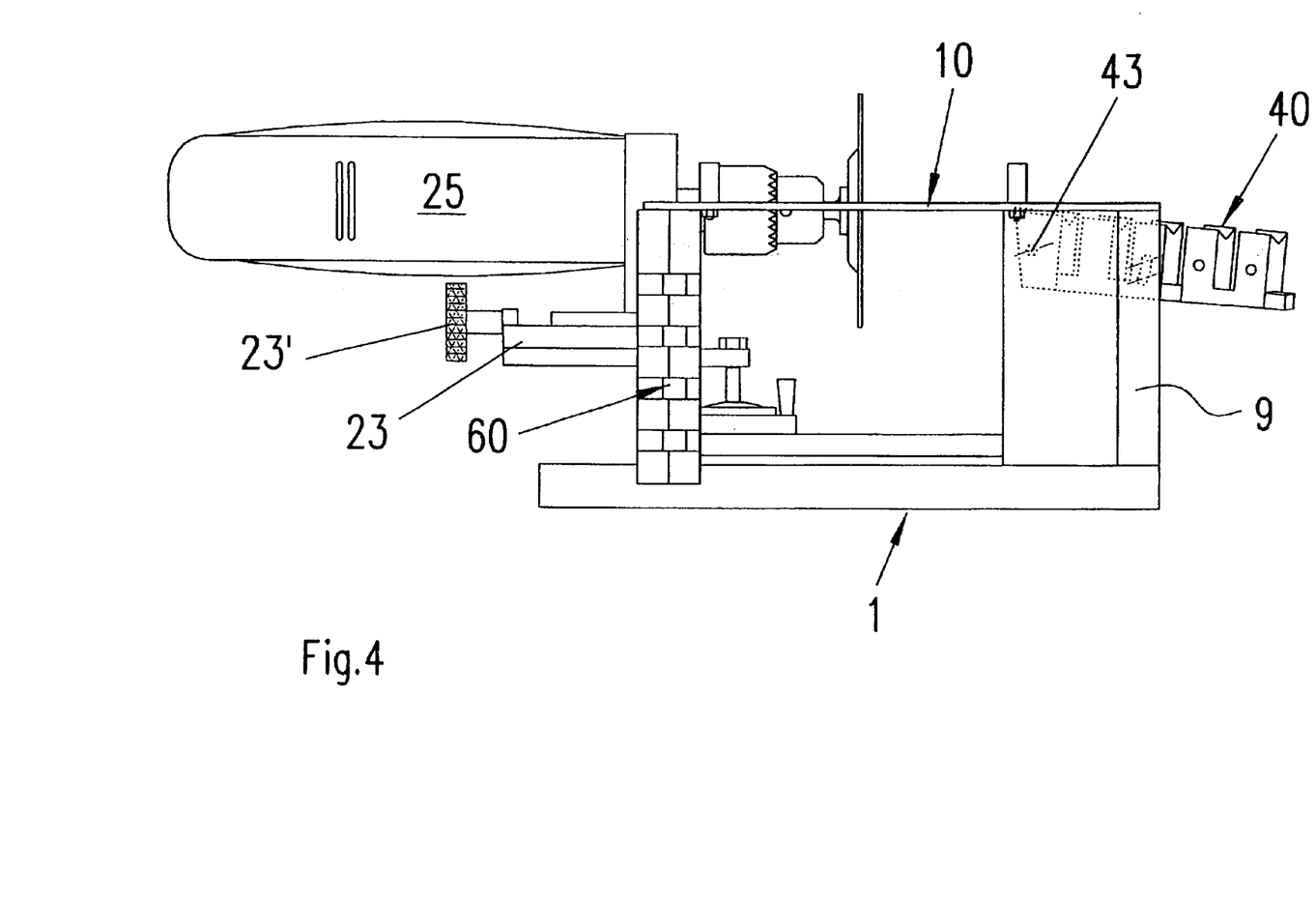
FIG. 4 illustrates a view of the first embodiment along direction IV of FIG. 1.

After the drill bit is clamped in the adapter 50, extension 51 is inserted into one of the spaces 42a–42d of the mounting device 40, so that a front area of the drill bit protrudes from the front area 41a' of the front mounting block 41a. The mounting device 40 is then positioned appropriately with respect to the carrying structure 9 of the device 1 by pivoting it around an axis 43, in which case the mounting device 40 is locked in its final position by means of a clamping element 45, arranged in an elongated slot 44 (FIGS. 3 and 4).

The ability to pivot the mounting device 40 is particularly advantageous for sharpening four faced drill bits, since in this case the angle of the grinding wheel 26 can be easily adjusted to the angle of the surface to be sharpened. The dressing tool 25 is then aligned correspondingly. By advancing the adapter 50, which is mounted with clearance in one of the spaces 42a–42d, the surface of the drill bit to be dressed is now pressed against the grinding wheel 26.

In order to achieve a correct insertion of the drill bit into the adapter 50, device 1 preferably possesses a means 60 for assisting in the mounting of the drilling tool.

Figure 8:
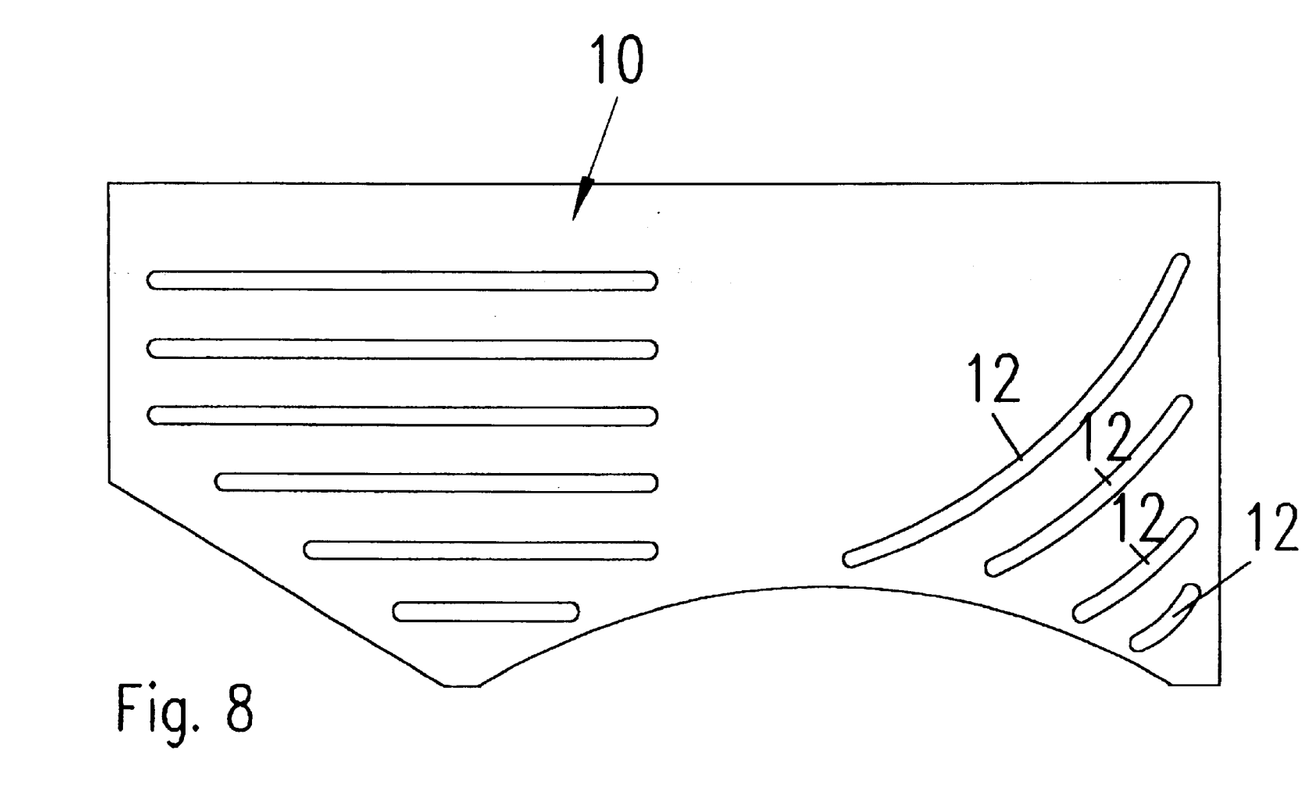
FIG. 8 illustrates an enlarged representation of a second embodiment of the support surface.

It is assumed in the above description that one positioning element 13 is associated with one linearly running elongated slot 12, which acts as guiding element 11. As the illustration in FIG. 8 shows, it is not necessary for the elongated slots 12 to be of a linear design. On the contrary, it is also possible that at least one of the elongated slots 12 of the support surface 10 is of a curved design.

Figure 9:
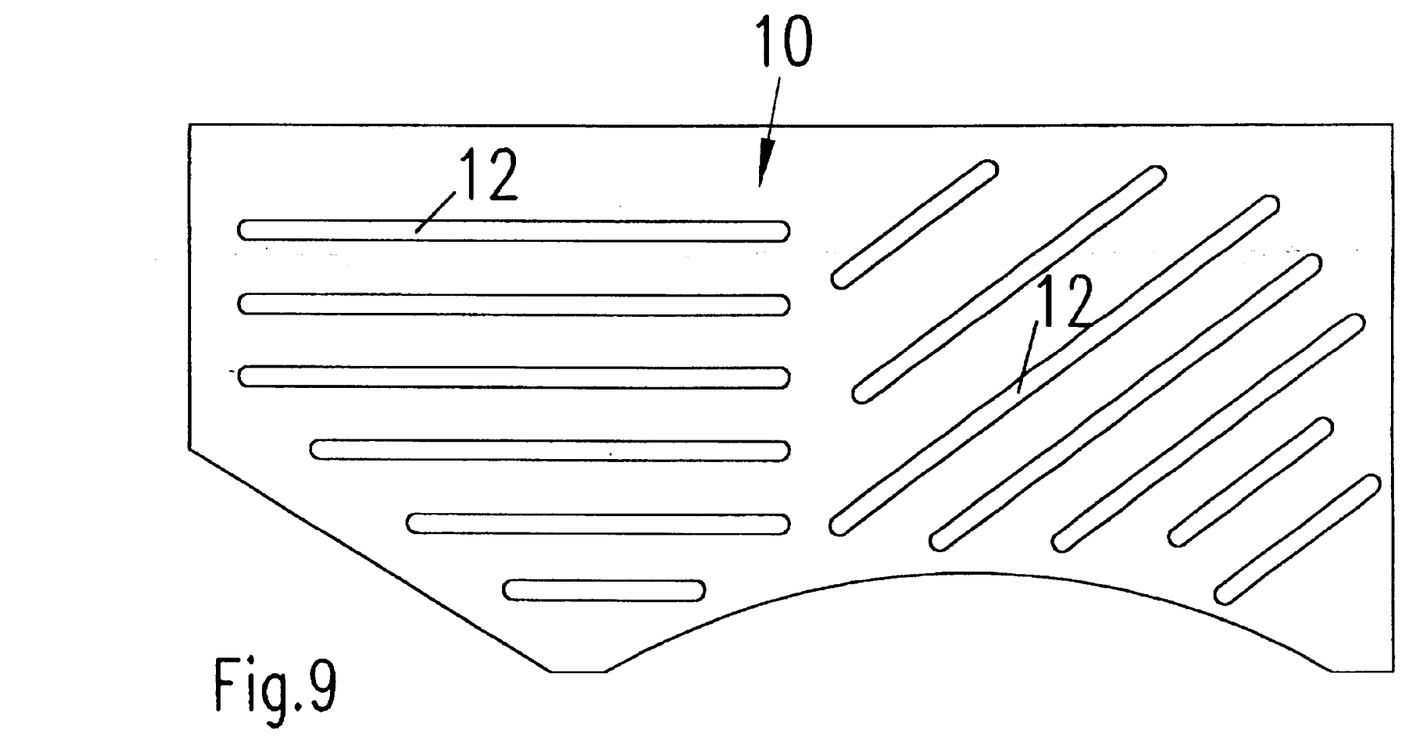
FIG. 9 illustrates an enlarged representation of a third embodiment of the support surface.

FIG. 9 illustrates another embodiment of the support surface 10, in which the elongated slots 12 on the left-hand side are of a linear design and parallel to the longitudinal extension of the support surface 10, whereas the elongated slots 12 on the right-hand side are linear, but arranged in an inclined manner to the longitudinal direction of the support surface 10.

Figure 10:
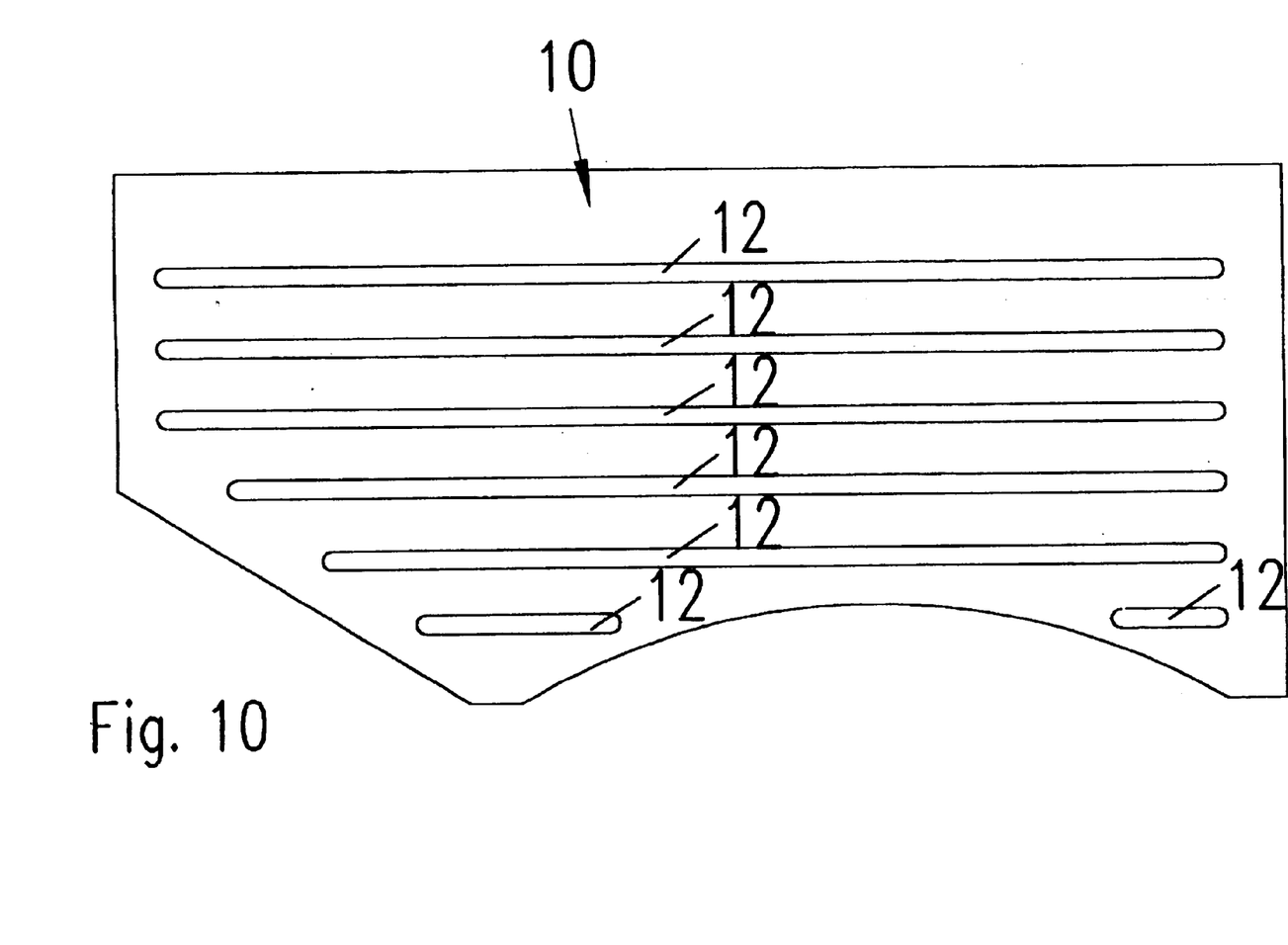
FIG. 10 illustrates an enlarged representation of a fourth embodiment of the support surface.
Figure 11:
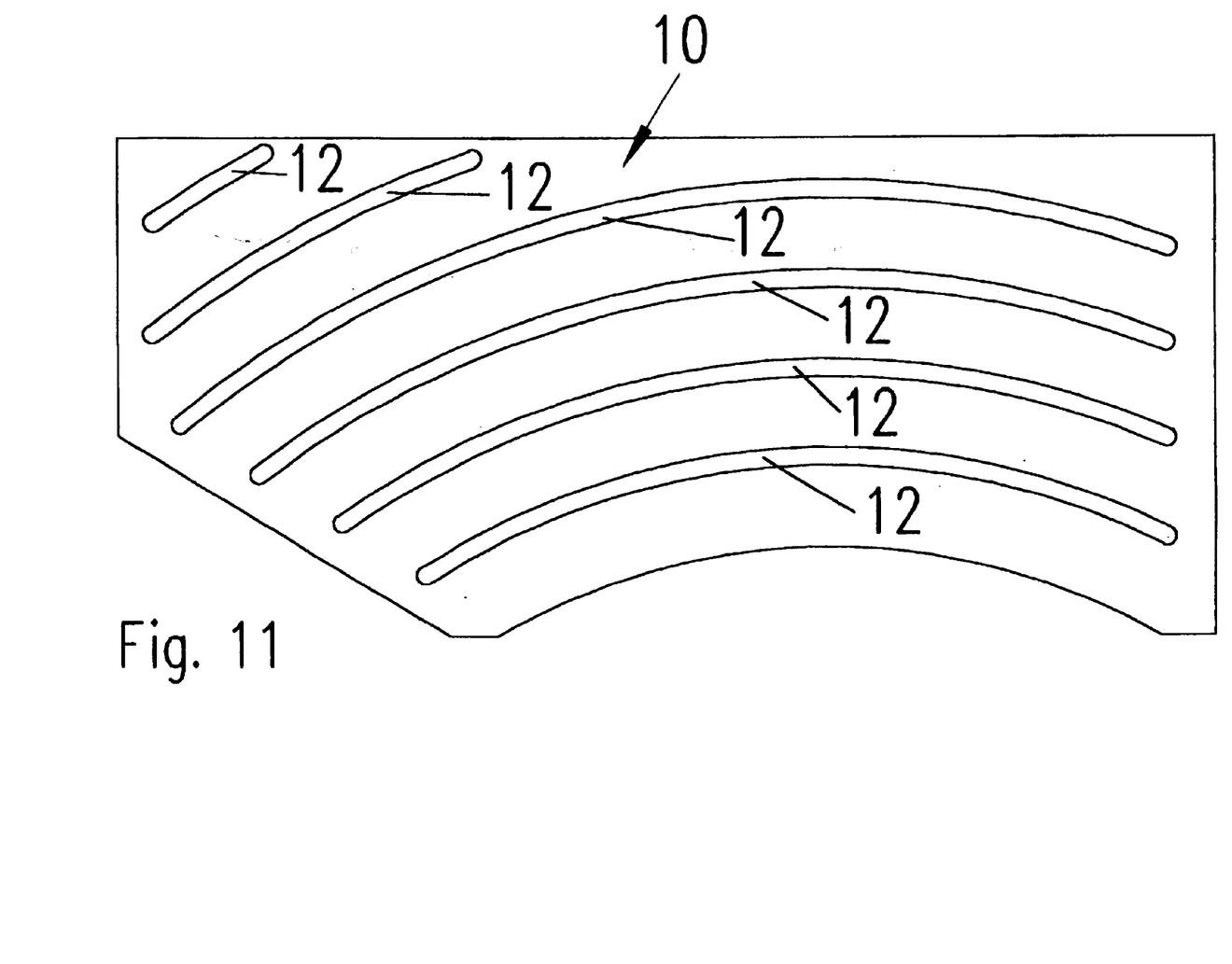
FIG. 11 illustrates an enlarged representation of a fifth embodiment of the support surface.

FIGS. 10 and 11 further illustrate other embodiments of the support surface 10, differing from the aforementioned embodiments in that the elongated slots 12 substantially extend over the entire length of the support surface 10, such that the two positioning pins 14 can be inserted in each one of these elongated slots 12.

Figure 12:
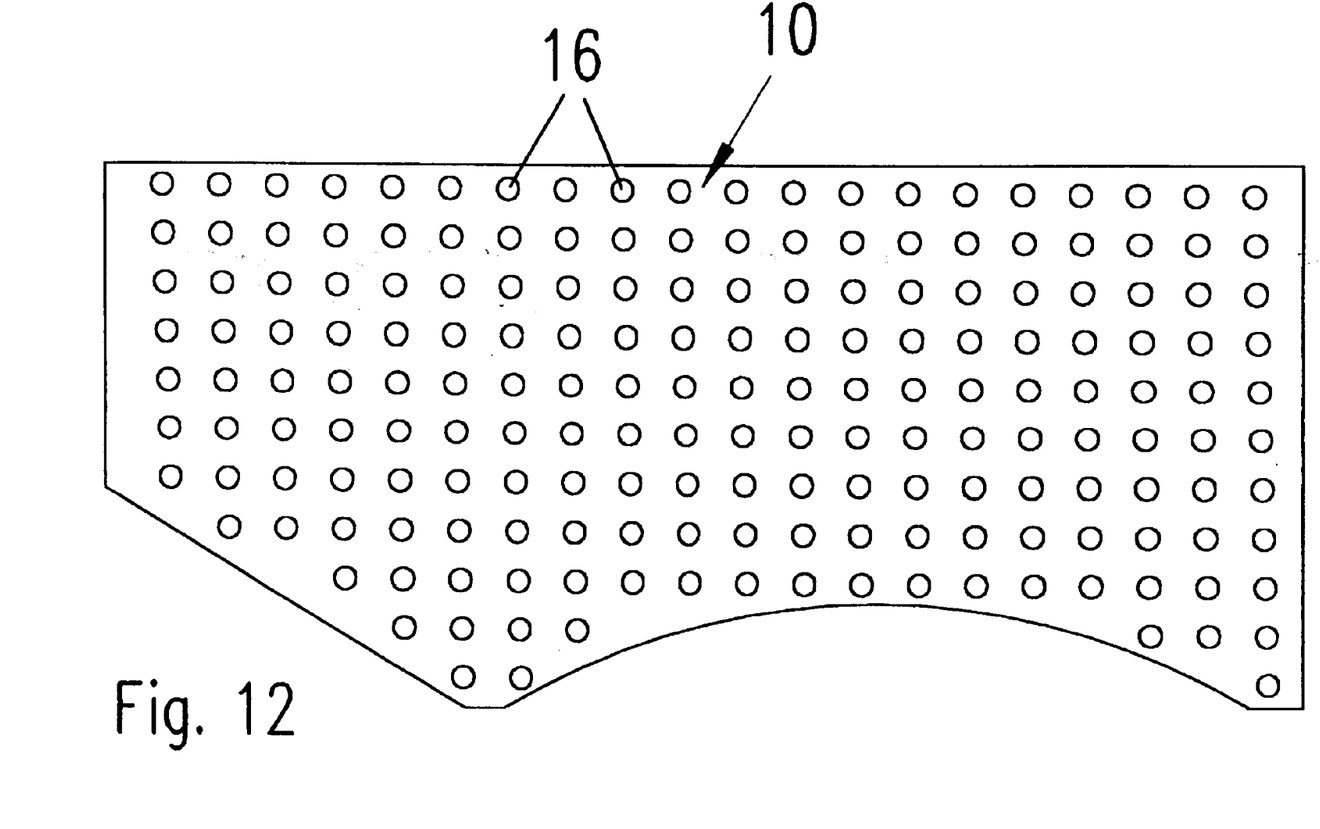
FIG. 12 illustrates an enlarged representation of a sixth embodiment of the support surface.

FIG. 12 illustrates another embodiment of the support surface 10. Instead of the elongated slots 12 of the previously described embodiments, a matrix shaped grid of openings 16 is provided wherein the positioning pins 14 acting as positioning elements 13 can be inserted.

Although the present invention has been described hereinabove by way of preferred embodiments thereof, it can be modified, without departing from the spirit and nature of the subject invention as defined in the appended claims.

What is claimed is:

1. A device for dressing a tool having a plurality of teeth, wherein said device comprises a support surface having guiding elements, said guiding elements having at least two movable positioning elements, said movable positioning elements being adapted to be locked in a fixed position within said guiding elements such that said positioning elements form a stop for said tool to be dressed; and a dressing tool mounted in a holding device positioned in front of a dressing side of said support surface, wherein said dressing tool is locked in position by a locking element during the dressing of said teeth, hence said dressing tool not being movable at least in a direction running substantially parallel to said dressing side;

wherein said positioning elements are arranged in said guiding elements in said support surface such that said tool to be dressed engages with said positioning elements at its side turned towards said dressing side of said support surface, so that said tool to be dressed can be moved towards said positioning elements by a feed movement proceeding in a feed direction starting from a feed side of the support surface, said feed side being located opposite said dressing side of said support surface, and being directed towards said dressing side; and wherein said engagement between said positioning elements and said tool to be dressed can be discontinued by a return movement of said tool to be dressed, said movement being oppositely directed to said feed movement.

2. The device according to claim 1, wherein said support surface is designed in such a way and that said positioning elements are arranged in said support surface so that the engagement between said positioning elements and said tool is discontinued by pulling back said tool in said direction opposite said feed movement and said tool to be dressed can be rotated on said support surface of said device, for positioning said tool in its subsequent dressing position.

3. The device according to claim 2, wherein one positioning element is positioned in one guiding element.

4. The device according claim 1, wherein at least one of said guiding elements is extending substantially over the entire length of said support surface.

5. The device according to claim 1, wherein at least one of said guiding elements is designed as an elongated slot or an opening in said support surface.

6. The device according to claim 5, wherein said support surface comprises a matrix-like grid of openings.

7. The device according to claim 1, wherein at least one of said elongated slots acting as guiding element is of a linear or of a curved design.

8. The device according to claim 1, wherein at least one of said elongated slots acting as guiding elements is positioned substantially parallel to the longitudinal direction of said support surface.

9. The device according to claim 1, wherein at least one of said elongated slots acting as guiding elements is positioned inclined to the longitudinal direction of said support surface.

10. The device according to claim 1, comprising a mounting device for a pin shaped tool.

11. The device according to claim 10, wherein said mounting device is pivotally connected to said device for dressing said tool.

12. The device according to claim 10, wherein said mounting device comprises at least two mounting blocks, said mounting blocks defining a space wherein an adapter can be inserted with clearance.

13. The device according to claim 10, wherein said adapter having a mounting opening, said mounting opening being capable of receiving said pin shaped tool.

14. The device according to claim 12, wherein said adapter comprises an extension, said extension being inserted into one of said spaces defined by said mounting blocks.

15. The device according to claim 12, wherein said adapter additionally comprises a clamping arrangement for securing a pin-shaped tool in said mounting device of said adapter.

16. The device according to claim 15, wherein said clamping arrangement comprises a tightening screw possessing a body.

17. The device according to claim 16, wherein said body of said tightening screw can be inserted in one of said spaces of said mounting device.

18. The device according to claim 1, wherein said holding device for said dressing tool comprises a guide rail along which said dressing tool can be moved and can be locked in position by means of said locking element.

19. The device according to claim 1, wherein said holding device additionally comprises a ball end bearing said dressing tool and enabling said dressing tool to be tilted.

20. The device according to claim 1, wherein said holding device possesses an adjustment means for positioning said dressing tool.

* * * * *